United States Patent [19]

Ekbatani

[11] Patent Number: 5,754,955
[45] Date of Patent: May 19, 1998

[54] PROVIDING MOBILE COMMUNICATIONS SYSTEM SERVICES IN DEPENDENCE ON IDENTIFICATION OF CELL WHERE A MOBILE-ORIGINATED CALL WAS INITIATED

[75] Inventor: Mehrdad Ekbatani, Guildford, United Kingdom

[73] Assignee: Telefonaktiebolaget LM Ericsson, Stockholm, Sweden

[21] Appl. No.: 532,940

[22] Filed: Sep. 22, 1995

[51] Int. Cl.$^6$ ............................................. H04Q 7/22
[52] U.S. Cl. ........................ 455/422; 455/435; 455/434; 455/436; 455/432
[58] Field of Search ...................... 379/58, 59; 455/33.1, 455/33.2, 54.1, 422, 432, 433, 434, 435, 436, 439, 550, 552, 560, 561, 412, 403

[56] References Cited

U.S. PATENT DOCUMENTS

| | | | |
|---|---|---|---|
| 5,235,633 | 8/1993 | Dennison et al. | 379/58 |
| 5,303,297 | 4/1994 | Hillis | 379/58 |
| 5,396,543 | 3/1995 | Beeson, Jr. et al. | 379/58 |
| 5,550,899 | 8/1996 | Mcleod et al. | 379/67 |
| 5,600,706 | 2/1997 | Dunnet et al. | 379/59 |

FOREIGN PATENT DOCUMENTS

| | | |
|---|---|---|
| 0568824 A2 | 7/1993 | European Pat. Off. . |
| 0597638 A1 | 5/1994 | European Pat. Off. . |
| WO95/19688 | 7/1995 | WIPO . |

OTHER PUBLICATIONS

Final draft prETS 300 527:1994—GSM 03.09 version 4.5.0, pp. 18–20, 38–39 (sections 5.6 and 11).

Final draft prETS 300 557:1994—GSM 04.08 version 4.10.0, pp. 47–49, 51–52 (sections 3.4.4, 3.4.4.1, 3.4.4.2 and 3.4.4.3).

Final draft prETS 300 590:1994—GSM 08.08 version 4.7.0, pp. 14–15, 29–30, 41 53–56, 65 and 68 (sections 3.1.1 through 3.1.1.1, 3.1.5.3 through 3.1.5.3.1, 3.1.16 through 3.1.17.2, 3.2.1.8–3.2.1.14, 3.2.1.31 through 3.2.1.32, 3.2.1.29 through 3.2.1.40.

Advertisement for CellularOne SafetyLink service, published in *The Washington Post* on Sep. 12, 1995, p. C10.

R. Bridge, "Free Calls in New Phone War", *Evening Standard*, Sep. 7, 1993, London.

"Upwardly Mobile", *Financial Times*, Sep. 8, 1993.

"The Newest Busy Line", *The Guardian*, Sep. 8, 1993.

(List continued on next page.)

*Primary Examiner*—Dwayne Bost
*Assistant Examiner*—Keith Ferguson
*Attorney, Agent, or Firm*—Burns, Doane, Swecker & Mathis, L.L.P.

[57] ABSTRACT

A mobile subscriber service is provided in a cellular communications system having a base station and a mobile switching center. The service may be a special billing rate based on where a mobile-originated call is initiated. The base station receives a channel request from the mobile subscriber, wherein the channel request indicates that the mobile subscriber is initiating a call. The base station assigns a first cell for immediate use by the mobile subscriber, the first cell being designated by an initial cell identifier. The initial cell identifier is sent from the base station to the mobile switching center, which stores the initial cell identifier in memory means for use when the mobile subscriber service is to be provided. When the mobile subscriber service is to be provided, the initial cell identifier is retrieved from the memory means, and a decision concerning an aspect of the mobile subscriber service is based on the retrieved initial cell identifier. In this way, the subscriber service may be based on where the mobile subscriber initiated the call, even if the requested call is actually established at a different cell, such as may occur during a directed retry operation. In another aspect of the invention, the mobile subscriber service may be a billing rate that depends on where a mobile-originated call is initiated.

8 Claims, 9 Drawing Sheets

OTHER PUBLICATIONS

A. Adonis, "Mercury Steps Up Mobile Phones Battle", *Financial Times*, Sep. 8, 1993.

V. Orvice & T. Hazell, "Free Calls—But is it a Phoney Price War?", *Daily Mail*, Sep. 8, 1993.

B. Macintyre, "Don't talk to me: telephone", *The Times*, Sep. 8, 1993.

V. Orvice, "Free Calls Offer in Battle of the Phones", *Daily Mail*, Sep. 8, 1993.

S. Gilchrist & N. Nuttall, "Free Mobile Phone Calls Challenge BT", *The Times*, Sep. 8, 1993.

M. Bannister, "Competitors Scorn Free Calls Loss Leader", *The Guardian*, Sep. 8, 1993.

S. Worthington, "Free Calls War", *The Sun*, Sep. 8, 1993.

Mercury One2One Press Release: "Mercury One 2 One Launches new Mobile Phone Marketing Offensive", Sep. 5, 1995.

Mercury One2One Press Release: "New 'Two Box' Strategy from Mercury One 2 One Splits Service and Handset Sales", Sep. 5, 1995.

Mercury One2One Press Release: "New Phones and New Phones Prices from Mercury One-2-One", Apr. 25, 1994.

Mercury One2One Press Release: "Aggressive New BusinessCall Pricing from Mercury One-2-One", Jun. 14, 1994.

Mercury One2One Press Release: "New Tariff from One-2-One Undercuts BT Call Charges by up to 25%", Sep. 8, 1994.

Mercury One2One Press Release: "Free Off-Peak Local Calls with Launch of Mercury One-2-One", Sep. 7, 1993.

Mercury One2One Press Release: "What's New About the One-2-One Mobile Phone Service from Mercury?", Sep. 7, 1993.

Mercury One2One Press Release: "Mercury Launches Assault on UK Mobile Phone Market with New One-2-One Tariffs", Sep. 7, 1993.

PROVIDING MOBILE COMMUNICATIONS SYSTEM SERVICES IN DEPENDENCE ON IDENTIFICATION OF CELL WHERE A MOBILE-ORIGINATED CALL WAS INITIATED

BACKGROUND

The present invention relates to mobile communications system services, and more particularly to the provision of mobile-originated calling services that vary in dependence on the identification of where the call was initiated.

Figure 1A:
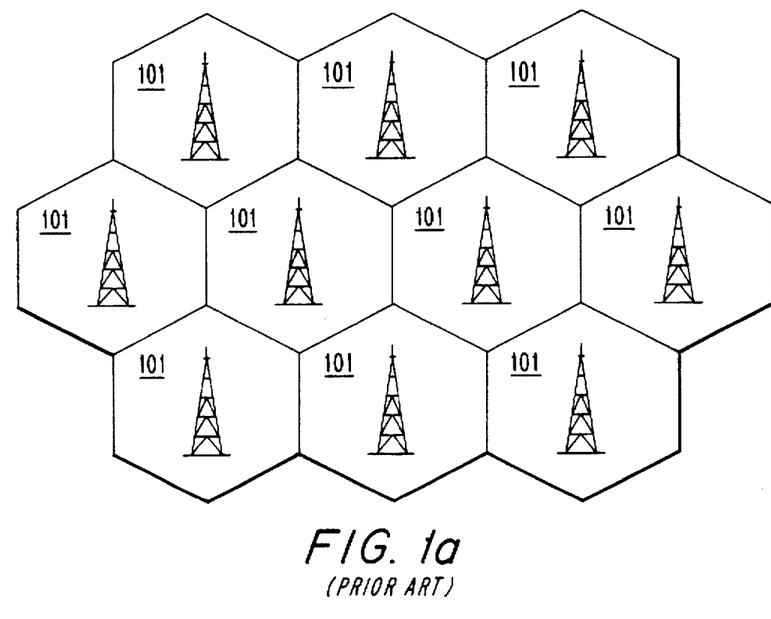
FIGS. 1a and 1b illustrate the organization of a prior art cellular communications system.
Figure 1B:
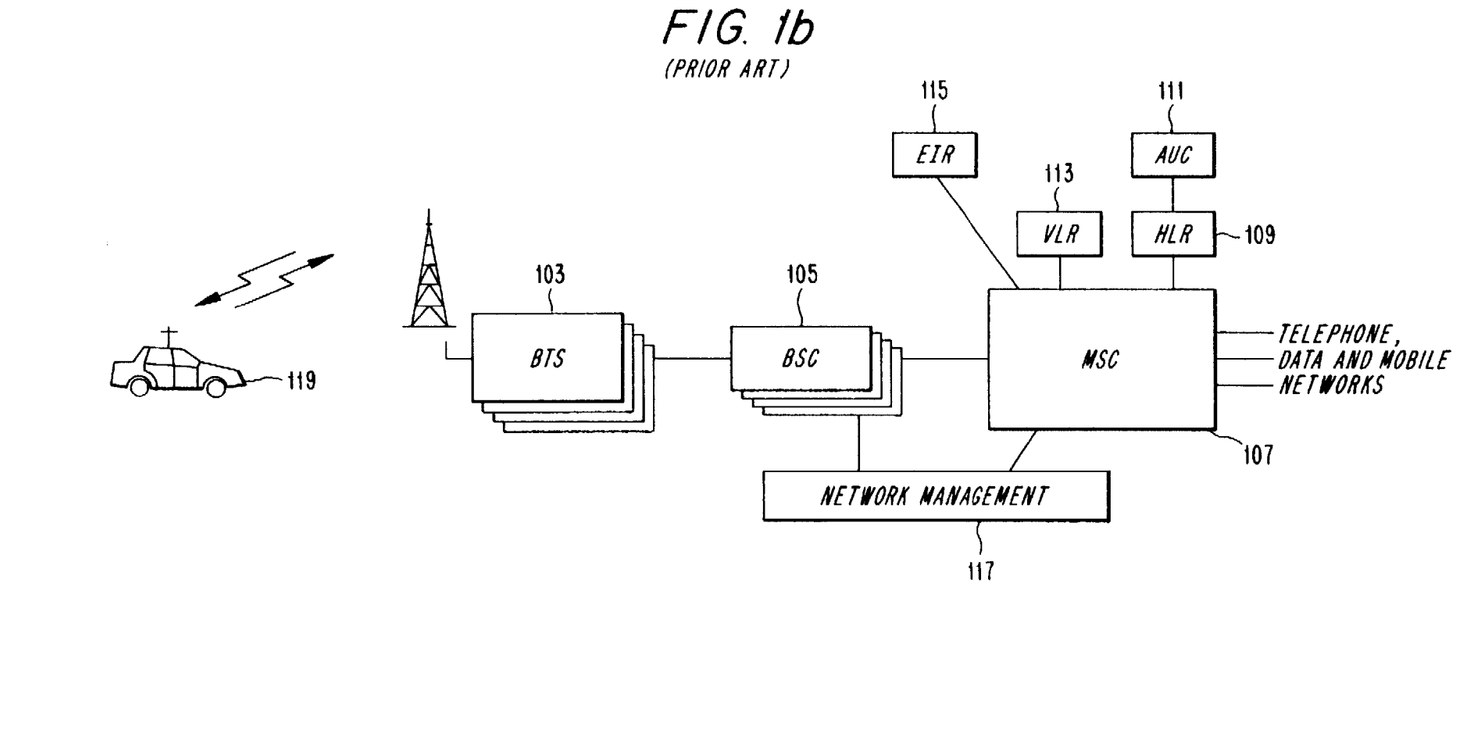

Cellular communications systems are well-known. To facilitate their introduction by independent operators, a number of communications system architectures, including intra-system communication protocols, have been standardized. One of these standards is the Global System for Mobile Communication (GSM), which is standardized by ETSI and CEPT. As illustrated in FIG. 1a, a GSM system, like many other cellular radio networks, is organized as a network of contiguous radio cells 101, together providing a complete coverage of the service area. Referring now to FIG. 1b, each cell has a Base Transceiver Station (BTS) 103 operating on a dedicated set of radio channels which are different from the channels used in adjacent cells. The primary function of each BTS 103 is to provide the base station radio transmission and reception. Each BTS 103 may contain one or more transceivers, to provide the required capacity. A cell site may be omni-directional, or may alternatively be split into typically three directional cells.

As shown in FIG. 1b, a group of the BTSs 103 is controlled by a Base Station Controller (BSC) 105. The primary function of the BSC 105 is Mobility Management. As a mobile subscriber (MS) 119 moves around, he is likely to move out of one cell 101 and into the area of another. The process by which the call is maintained without a noticeable break is known as handover. In order to keep the handover process as short as possible, GSM requires that, during a call, the mobile station "listens out" to all surrounding base stations and gives a continuous report of their respective signal strengths to the BSC 105. This allows the BSC 105 to make a very good decision on when to initiate a handover, and to which new cell the call should be forwarded.

The GSM standard also features power control of mobile stations and, optionally, the BTSs 103. This reduces the signal levels radiated, thereby minimizing interference to other GSM users, and maximizing battery life.

A group of BSCs 105 is served by a Mobile services Switching Center (MSC) 107, which routes calls to and from the Public Switched Telephone Network (PSTN) (not shown), Integrated Services Digital Network (ISDN) (not shown), Public Data Networks (not shown) and possibly various private networks (not shown).

The MSC 107 may also be connected to other MSCs on the same network and to other GSM networks. Several important data bases are provided for storing information about subscribers. One of these, the Home Location Register (HLR) 109, carries information about subscription levels, supplementary services and the network and location area currently, or most recently, in use by those subscribers to the network who are associated with the MSC 107. The HLR 109 works in close association with an Authentication Center (AUC) 111, which provides the information to authenticate all calls in order to guard against possible fraud, stolen subscriber cards or unpaid bills.

A Visitor Location Register (VLR) 113 is also provided for storing information about subscription levels, supplementary services and location area for a subscriber currently, or most recently, on that area (i.e., the "visited area"). The VLR 113 may also know whether a subscriber is currently active, in order to avoid the delay and use of the network in trying to signal to a phone that is switched off.

An Equipment Identity Register (EIR) 115 stores information about the type of mobile station in use. Its utility includes barring a call if the mobile station is found to be stolen, not Type Approved, or if it has a fault that can disturb the network.

Network Management 117 is provided for monitoring and controlling the major elements of the infrastructure. In particular, the Network Management 117 monitors and reports faults, grade of service and network performance.

The GSM standard further includes a comprehensive digital signalling scheme. The well-known Mobile Application part (MAP) of CCITT Signalling System No. 7 is used between the MSC 107 and the HLR 109 and VLR 113, and also between MSCs 107 in the system. This signalling is additional to the telephony traffic, since GSM has introduced new features such as international roaming and authentication. Further examples of its use include call set-up, handover, authentication, transfer of subscriber information on location updating and management of supplementary services.

Figure 2:
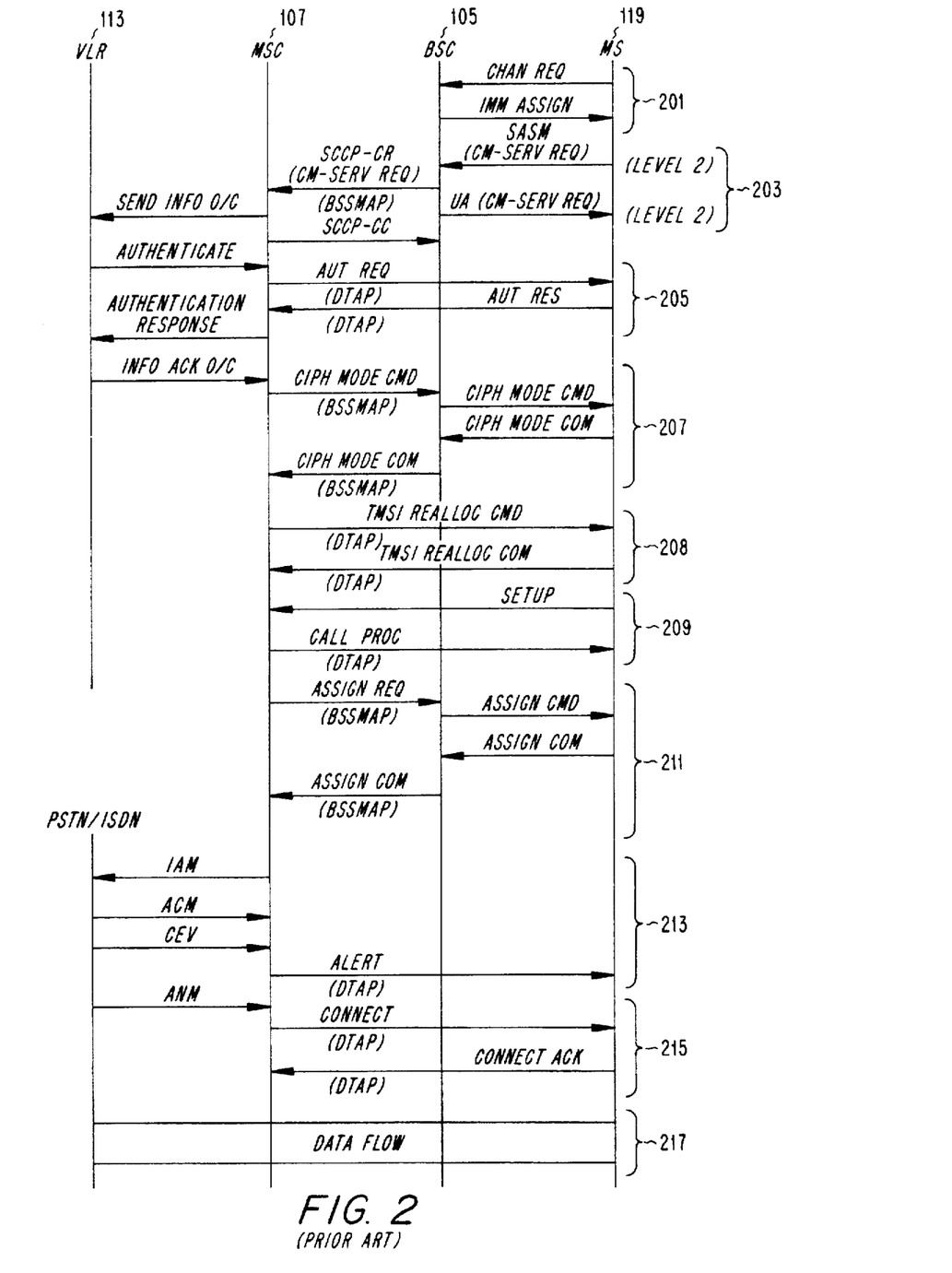
FIG. 2 illustrates the steps for making a mobile-originated call in a prior art cellular communications system.

One of the GSM protocols defines the steps that are required to take place whenever an MS 119 originates a call. These steps are illustrated in FIG. 2. Reference is also made to the following sections of the GSM standard: GSM 08.08 version 4.7.0, GSM 03.09 version 4.5.0, and GSM 04.08 version 4.10.0, which are all incorporated herein by reference in their entirety. For simplicity of understanding, FIG. 2 shows some messages being exchanged directly between the MS 119 and the BSC 105. It should be understood, however, that all messages communicated between these entities must flow through a BTS 103, since the GSM standards do not define any direct connection between the MS 119 and the BSC 105.

Because the messages associated with an MS-originated call in a GSM system are well-known, they are not described here in great detail. However, they may be summarized as follows: The MS 119 sends a request for a signalling channel using the random access channel (step 201). The MS 119 indicates that it wants to set up a call. The identity (IMSI) of the MS 119 is analyzed, and the MS 119 is marked as "busy" in the VLR 113 (step 203). Authentication is performed (step 205), and ciphering may be initiated (step 207). A temporary identity (TMSI) is assigned (step 208) for use by the MS 119 during this call. The use of a TMSI is a security measure that prevents a subscriber from being identified by any eavesdropping listeners to the call.

Next, the MSC 107 receives a setup message from the MS 119. The setup message includes information identifying the kind of service that the MS 119 wants, and further includes the number (called the "B-number") that was dialled by MS 119. The MSC 107 checks that the MS 119 does not have services like barring of outgoing calls activated. Such barring could be activated either by the subscriber or by the system operator. If the MS 119 is not barred from initiating a call, then the setup of the call will proceed (step 209).

A link is established between the MSC 119 and the BSC 105, and a traffic channel is seized. The MSC 119 sends a request to the BSC 105 to assign a traffic channel. In response, the BSC 105 checks whether there is an idle traffic channel, and if so, assigns it for this call and tells the BTS 103 to activate the channel. This includes informing the MS 119 of the identity of the channel that has been assigned. The BTS 103 sends an acknowledge back when the activation is completed. The BSC 105 then informs the MSC 107 when the assignment is completed (step 211).

Next the traffic control subsystem analyzes the digits of the number dialed by the MS 119, and sets up the connection to the called subscriber. The call is through-connected in the group switch. An alerting message will be sent to the MS 119, indicating that a ringing tone has been generated on the other side (step 213). The ringing tone generated in the exchange at the B-subscriber side will be sent to the MS 119 via the group switch in the MSC 107. This means that the ringing tone is sent over the air, not generated in the MS 119. When the B-subscriber answers, the network sends a connect message to the MS 119 to indicate that the call has been accepted. The MS 119 returns a connect acknowledgement, which completes the call setup (step 215). The MS 119 may then exchange data (including voice data) with the called subscriber (step 217).

The above-described MS-originating call establishment procedure was with non-Off Air Call SetUp (non-OACSU), which is also called early assignment. This means that the network allocates a traffic channel to the MS 119 before it initiates call establishment in the fixed network. In an alternative embodiment, called OACSU, the network determines when the traffic channel is to be assigned. The traffic channel assignment may be performed at any time after call establishment has been initiated in the fixed network (referred to as "late assignment"). In the most extreme case, the network allocates a traffic channel after the called subscriber has answered the call.

In the late assignment procedure, an alerting message is sent to the MS 119 when user alerting has been initiated at the called side. This differs from the above-described early assignment method in that, except for the case of data, the ringing tone is generated locally in the MS 119 because no traffic channel is yet allocated. When the called subscriber answers, the network initiates the assignment procedure in order to allocate a traffic channel.

Figure 3:
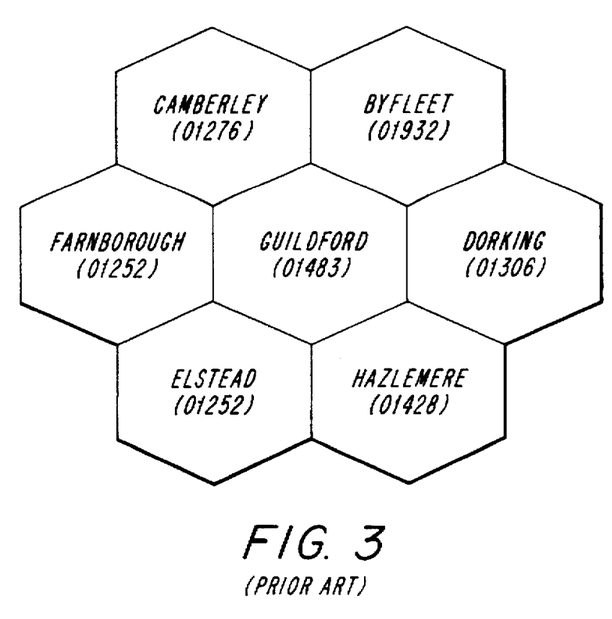
FIG. 3 illustrates how tariff areas are established in a prior art cellular system.

Various operators of cellular systems continue to offer new features and services to subscribers. One such feature, offered for example by Mercury one2one (Mo2o) in Great Britain, is an uncommon tariffing structure for non-business subscribers. Included in this tariffing structure is one which offers non-business subscribers the facility to make free local calls after 7:00 pm from their designated home area. Mo2o has set up its charging areas, as illustrated in FIG. 3, so that cells and location areas have coverage over roughly the same areas as British Telecom (BT) standard area codes. Therefore, a subscriber living in Guildford (area code =01483) will have the 01483 area as his designated home area in the cellular system. All calls placed by the mobile subscriber to any telephone having BT area code 01483, or to any telephone having a BT area code corresponding to any of the immediately neighboring cells, are considered by Mo2o as local calls, and hence are not charged after 7:00 pm. Additionally, all non-local calls that are initiated from the mobile subscriber's home area are accorded preferential tariff rates.

When a subscriber wants to take advantage of the favorable tariff rate as described above, he may first check the display on his MS 119 to ensure that he will be placing the call from his home area. The MS 119 is able to display this information because, while it is idle, it is camped on to a nearby BTS 103, which periodically broadcasts cell identification information to all MSs 119 in the vicinity. This broadcast is performed in accordance with the Short Message Service Cell Broadcast function as defined in the GSM specification (see, e.g., GSM 08.58 version 4.6.0, at section 5.6).

Figure 4:
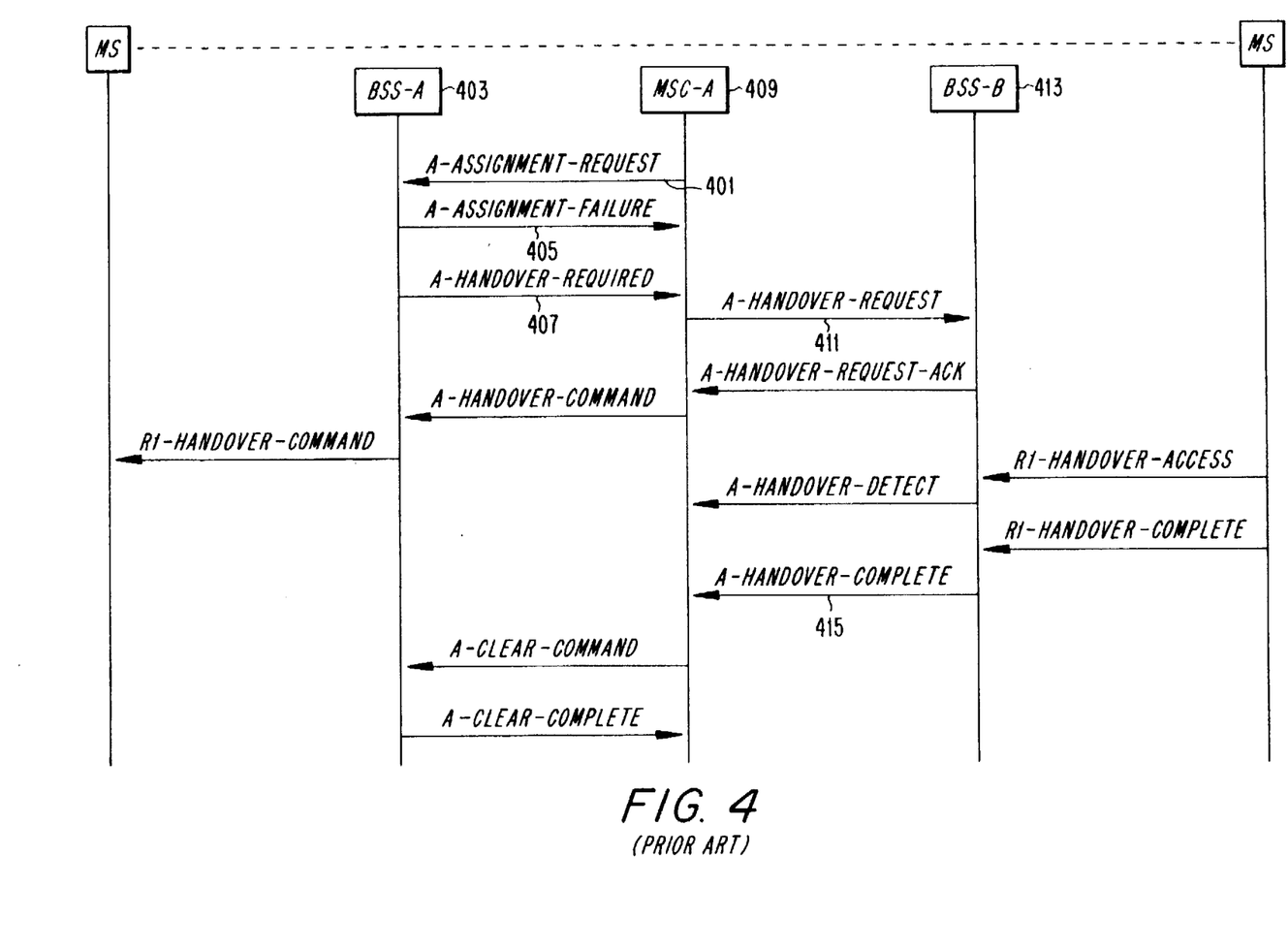
FIG. 4 illustrates the steps for performing a directed retry operation in a prior art cellular communications system.

It is desirable to improve cellular systems, such as the Mo2o system, by further implementing the optional "directed retry" feature as defined in the GSM specification. As described in section 11 of GSM 03.09 version 4.5.0, the directed retry procedure allows the network to select the optimum cell for the Mobile Station. The process of directed retry involves the assignment of a Mobile Station to a radio channel on a cell other than the serving cell. As explained in sections 3.1.1 et seq. of GSM 08.08 version 4.7.0, the purpose of the assignment procedure is to ensure that the correct dedicated radio resource can be allocated or reallocated to a MS that requires it. However, the initial random access by the MS and "Immediate Assignment" to a DCCH is handled autonomously by the base station system (BSS) (i.e., the BTS 103 considered in conjunction with the BSC 105) without reference to the MSC 107. The channel assigned in the "Immediate Assignment" process is one associated with the location area that the previously idle MS 119 had been camped onto. Then, as described above with respect to step 203 of FIG. 2, the MSC 107 receives a setup message from the MS 119. The setup message includes information identifying the kind of service that the MS 119 wants, and further includes the number (called the "B-number") that was dialled by the MS 119. The MSC 107 analyzes this call control information, and then makes a resource request to the appropriate BSS by sending it an ASSIGNMENT REQUEST message 401, as shown in FIG. 4. This message contains details of the resource that is required (for instance channel rate, channel type, data adaption, priority level, and the like). If the requested resource is for speech or data it also indicates the terrestrial circuit that shall be used between the MSC 107 and BSS. A full description of the ASSIGNMENT REQUEST message 401 may be found in section 3.2.1.1 of GSM 08.08 version 4.7.0.

If, during this assignment phase, a handover becomes necessary, due to either radio conditions or congestion, then the MS 119 may be handed over to a different cell. When the decision has been made to handover the MS 119, the BSS-A 403 may send an ASSIGNMENT-FAILURE message 405 message, indicating "directed retry", before sending the HANDOVER-REQUIRED message 407 to MSC-A 409, indicating "directed retry". However, BSS-A 403 may alternatively send the HANDOVER-REQUIRED message 407, indicating "directed retry", without sending the ASSIGNMENT-FAILURE message 405. The HANDOVER-REQUIRED message 407 includes a list of one or more preferred cell_ids for the handover (see Section 3.2.1.9 of GSM 08.08 version 4.7.0). Upon receipt of the HANDOVER-REQUIRED message from BSS-A 403, the MSC-A 409 initiates the handover as described in sections 6 and 7 of GSM 03.09 version 4.5.0. That is, the MSC-A 409 selects a cell, and sends a HANDOVER-REQUEST message 411 to a BSS-B 413 that is associated with the selected cell (see Section 3.2.1.8 of GSM 08.08 version 4.7.0). The HANDOVER-REQUEST message 411 includes both the initial_cell_id (i.e., the identification of the presently serving cell) and the final_cell_id (i.e., the identification of the target cell for the handover). The BSS-B 413 then performs well-known steps to accomplish the handover. No resources are cleared in the MSC-A 409 or BSS-A 403 for this connection. After receipt of the HANDOVER-COMPLETE message 415 from BSS-B 413, the assignment procedure is considered complete and the resources on BSS-A 403 are cleared. At this point, the MSC-A 409 concludes that the serving cell for the MS 119 is the final_cell_id that was included as part of the HANDOVER-REQUEST message 411.

The reason why existing implementations of the call initiation location-dependent tariff rate feature are incompatible with the directed retry capability is they rely on the cell identifier contained in the ASSIGNMENT COMPLETE message (see step 211 in FIG. 2) that is sent from the BSC 105 to the MSC 107, or alternatively on the final_cell_id that was included as part of the HANDOVER-REQUEST message 411 in those cases where a directed-retry has been performed. However, as explained in Section 3.1.1.1 of GSM 08.08 version 4.7.0, if an intra-BSS cell change has occurred during the assignment, it is the new cell identity that is included in the ASSIGNMENT COMPLETE message. Also, if a directed retry is performed, the final_cell_id contained in the HANDOVER-REQUEST message 411 is not going to be the same as the initial_cell_id. Thus, even though a subscriber may believe he is complying with requirements for a free local call by originating that call from his home area as indicated by the display on the mobile unit, he may nonetheless be charged for it if directed retry causes the call to finally be established through a different cell.

Therefore, there is the need to provide a mechanism to permit services to be provided to a mobile subscriber based on where that subscriber initiated a call, regardless of how that call was actually established by the network.

SUMMARY

It is therefore an object of the present invention to provide methods and apparatus for basing subscriber services on the cell in which an MS-originated call was initiated, rather than on the cell in which it was established by the network.

In accordance with one aspect of the present invention, the foregoing and other objects are achieved in methods and apparatus for providing a mobile subscriber service in a cellular communications system having a base station and a mobile switching center. The method comprises the steps of, in the base station, receiving a channel request from the mobile subscriber, wherein the channel request indicates that the mobile subscriber is initiating a call; and then assigning a first cell for immediate use by the mobile subscriber, the first cell being designated by an initial cell identifier. The initial cell identifier is then sent from the base station to the mobile switching center. In the mobile switching center, the initial cell identifier is stored in memory means for use when the mobile subscriber service is to be provided. Then, when the mobile subscriber service is to be provided, the invention further comprises retrieving the initial cell identifier from the memory means; and basing a decision on the retrieved initial cell identifier, wherein the decision concerns an aspect of the mobile subscriber service.

In one embodiment of the invention, the mobile subscriber service is generation of a bill; and the decision is selection of a billing rate for the call. The billing rate may be, for example, provision of a free call if the initial cell identifier designates a home area of the mobile subscriber.

In accordance with another aspect of the invention, in the base station, after assigning the first cell for immediate use by the mobile subscriber but before the call has been established, a second cell is assigned for use by the mobile subscriber during the call, the second cell being designated by a final cell identifier, wherein the second cell is different from the first cell; and the final cell identifier is sent from the base station to the mobile switching center.

In yet another aspect of the invention, in the mobile switching center, the final cell identifier is stored in the memory means for use when the mobile subscriber service is to be provided. Then, when the mobile subscriber service is to be provided, the final cell identifier is retrieved from the memory means; and the decision is based on the retrieved initial cell identifier and the retrieved final cell identifier.

BRIEF DESCRIPTION OF THE DRAWINGS

The objects and advantages of the invention will be understood by reading the following detailed description in conjunction with the drawings in which.

DETAILED DESCRIPTION

The various features of the invention will now be described with respect to the figures, in which like parts are identified with the same reference characters.

Figure 5:
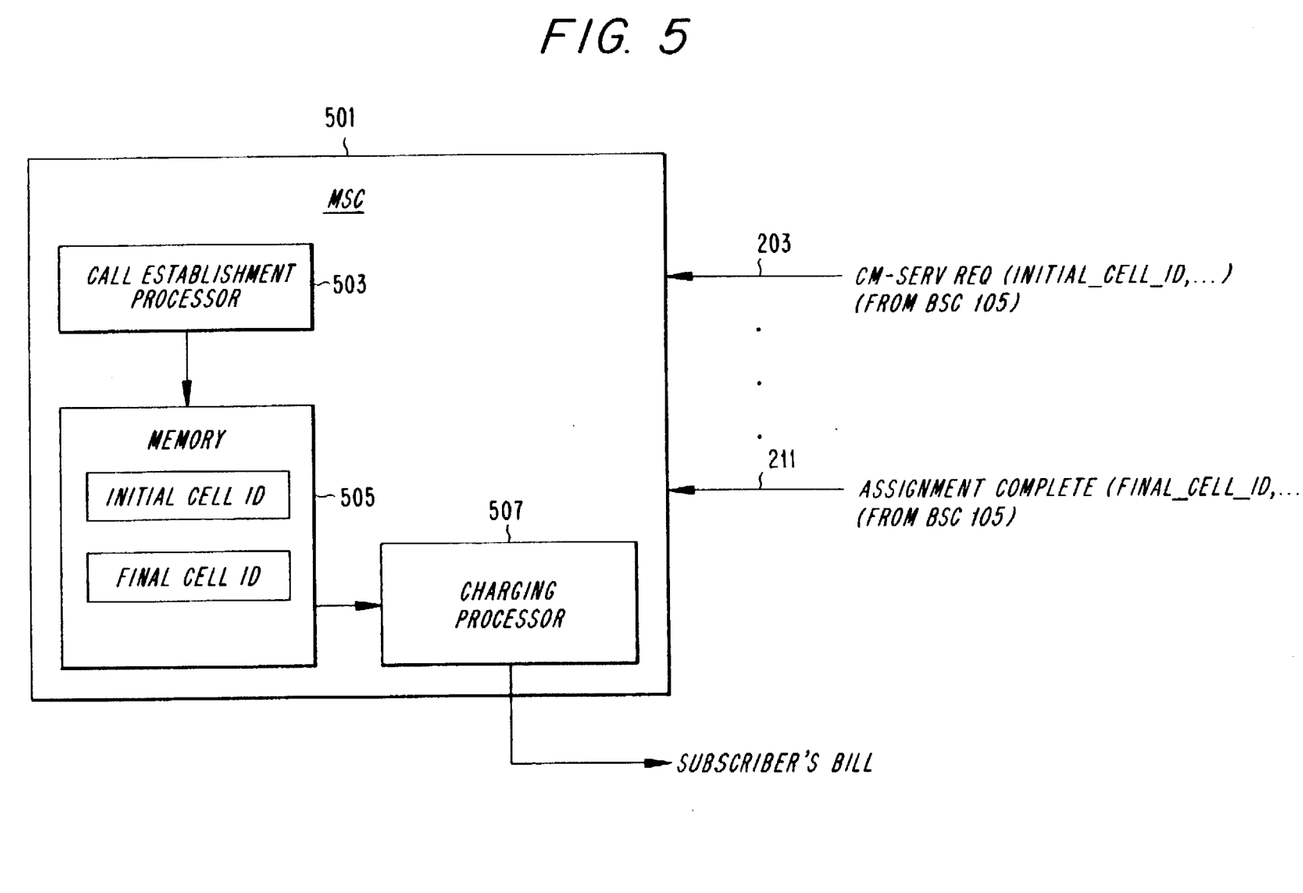
FIG. 5 is a block diagram of a mobile services switching center in accordance with one embodiment of the invention.

Referring to FIG. 5, a block diagram of an MSC 501 in accordance with one embodiment of the invention is shown. The invention relies on the fact that, in accordance with Sections 3.1.16 and 3.2.1.32 of GSM 08.08 version 4.7.0, the identifier (henceforth referred to throughout this description as "initial_cell_id") of the cell in which a control channel was initially assigned to the MS 119 as a result of the IMMEDIATE ASSIGNMENT message 201 is included with the CM-SERV REQ message 203 that is sent from the BSC 105 to the MSC 501. That is, the CM-SERV REQ message 203 is actually piggybacked, via the BSSAP SCCP connection, in a BSSMAP COMPLETE LAYER 3 message which includes the "Cell identifier" parameter.

In accordance with the invention, the MSC 501 includes a call establishment processor 503 which performs all of the prior art steps for establishing an MS-originated call, such as those depicted in FIG. 2, in addition to new steps, which are described below. The call establishment processor 503 may, for example, be a general purpose digital computer that executes a program that is designed to perform the steps described here.

Figure 6A:
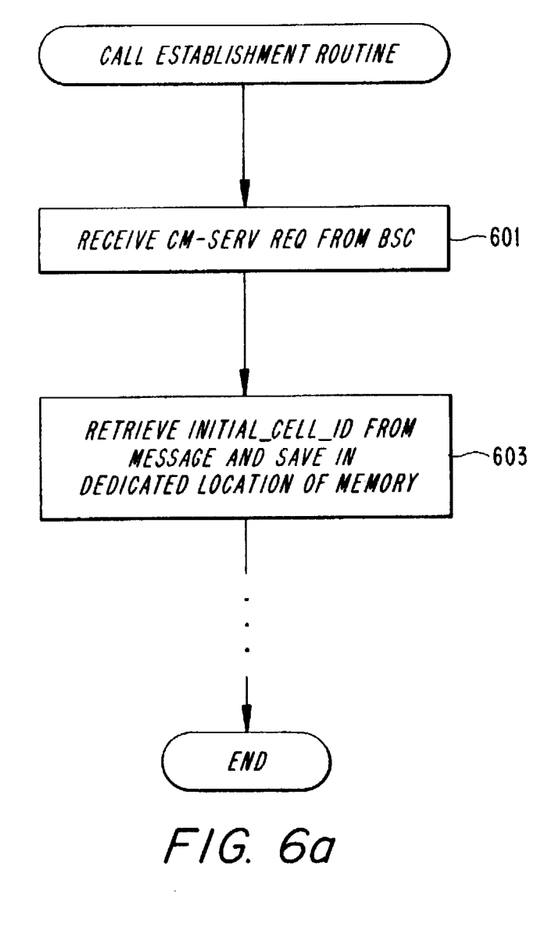
FIGS. 6a and 6b are flowcharts of methods for establishing a call and preparing a subscriber bill in accordance with one embodiment of the invention.

In one embodiment of the invention, the call establishment processor 503 performs the steps depicted in the flowchart of FIG. 6a. In step 601, the CM-SERV REQUEST message is received from the BSC 105, in accordance with call establishment procedures depicted, for example, in FIG.

2 (see step 203). Next, in step 603, the initial_cell_id parameter is retrieved from the received message, and stored at a dedicated location of a memory 505. As used throughout this disclosure, the phrase "dedicated location" is intended to mean a location of the memory 505 whose contents will be preserved (i.e., not overwritten) even if the call is eventually established at a cell (final_cell_id) other than that in which the call was initiated. The memory 505 may be, for example, a device such as a dynamic random access memory (DRAM), or may alternatively be a different type of storage medium, such as a magnetic data storage device. The remainder of the call establishment routine depicted in FIG. 6a comprises steps that are known in the art for establishing an MS-originated call, and are not described here further.

Figure 6B:
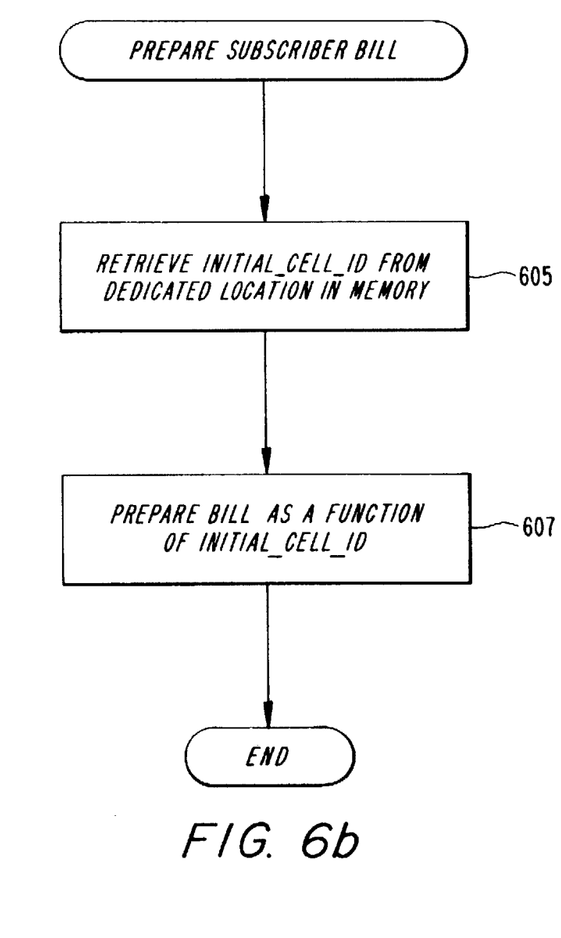

When it is time to prepare a bill for the subscriber's usage of the system, a charging processor 507 performs the steps illustrated in FIG. 6b. First, it retrieves the initial_cell_id from the memory 505 (step 605). Next, the charging processor 507 uses the retrieved information to determine the tariff that is applicable to this particular call (step 607). For example, as described in the BACKGROUND section, the user may not be charged anything for this call if it was made after a predetermined time (e.g., 7:00 pm) and if initial_cell_id designates the subscriber's home area. The charging processor 507 may be implemented as a general purpose digital computer that executes a program that is designed to perform the functions described here.

Figure 7A:
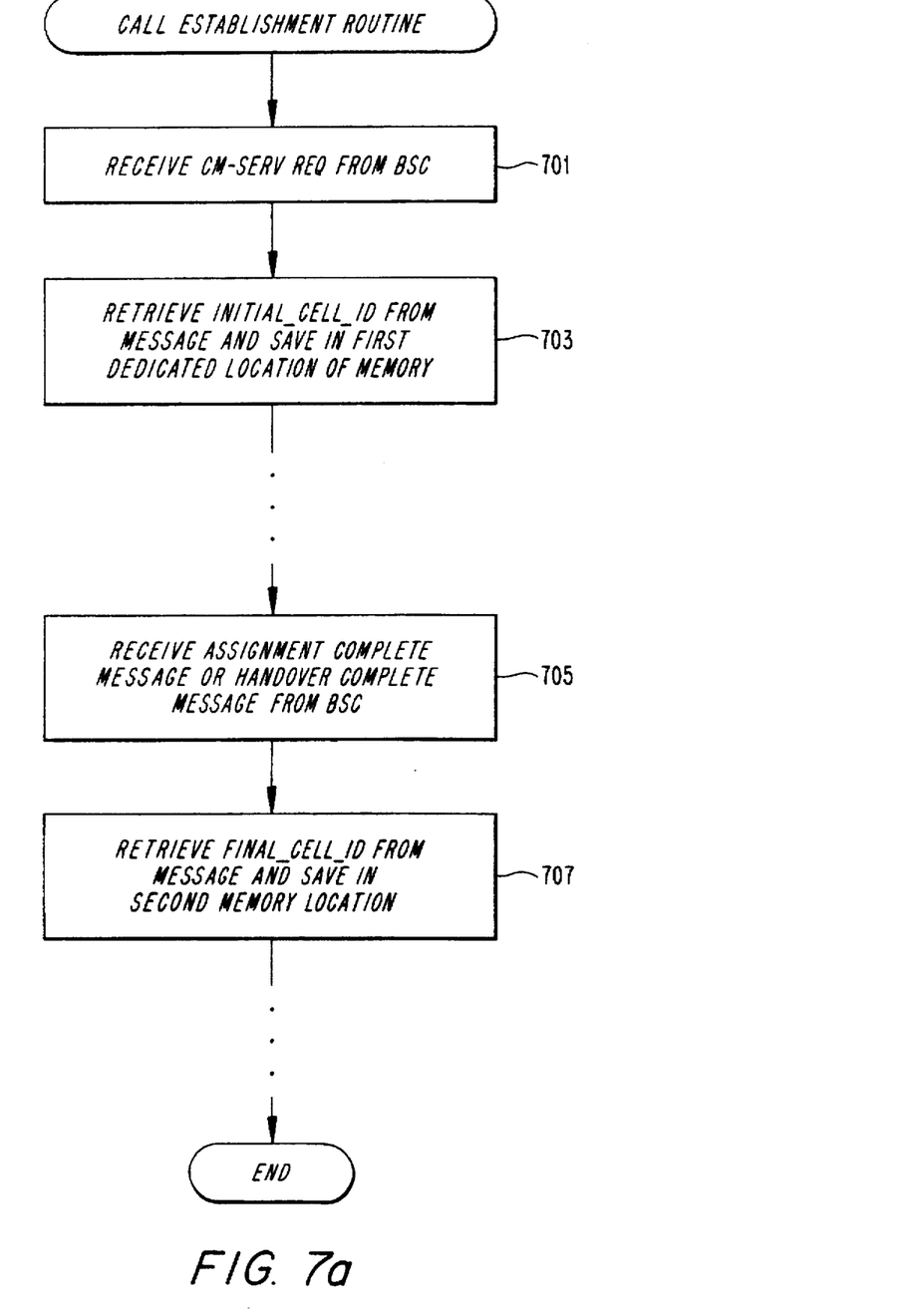
FIGS. 7a and 7b are flowcharts of methods for establishing a call and preparing a subscriber bill in accordance with another embodiment of the invention.

An alternative embodiment of the call establishment processor 503 is depicted in the flowchart of FIG. 7a. As before, the CM-SERV REQUEST message is received from the BSC 105 (step 701). The initial_cell_id is then extracted from the received message, and is stored into a first dedicated location of the memory 505 (step 703). Call establishment processing then continues as described, for example, in FIG. 2, until either the ASSIGNMENT COMPLETE message 211 is received from the BSC 105, or the HANDOVER-COMPLETE message 411 is received from the BSS-B 413 (step 705). The cell identifier parameter that is included within the ASSIGNMENT COMPLETE message (see Section 3.2.1.2 of GSM 08.08 version 4.7.0) or alternatively, in the event of a directed retry, within the HANDOVER-REQUEST message 411 (see Section 3.2.1.8 of GSM 08.08 version 4.7.0) will indicate the cell (possibly a new cell, e.g., as a result of directed retry) that was finally assigned for establishment of this call. This cell identifier will henceforth be referred to throughout this description as "final_cell_id." The call establishment processor 503 retrieves the final_cell_id from the ASSIGNMENT COMPLETE message 211 or alternatively from the HANDOVER-REQUEST message 411, and stores it into a second storage location of the memory 505, so that now both the initial_cell_id and the final_cell_id have been saved (step 707). Call establishment processing then continues as previously described with respect to FIG. 2.

Figure 7B:
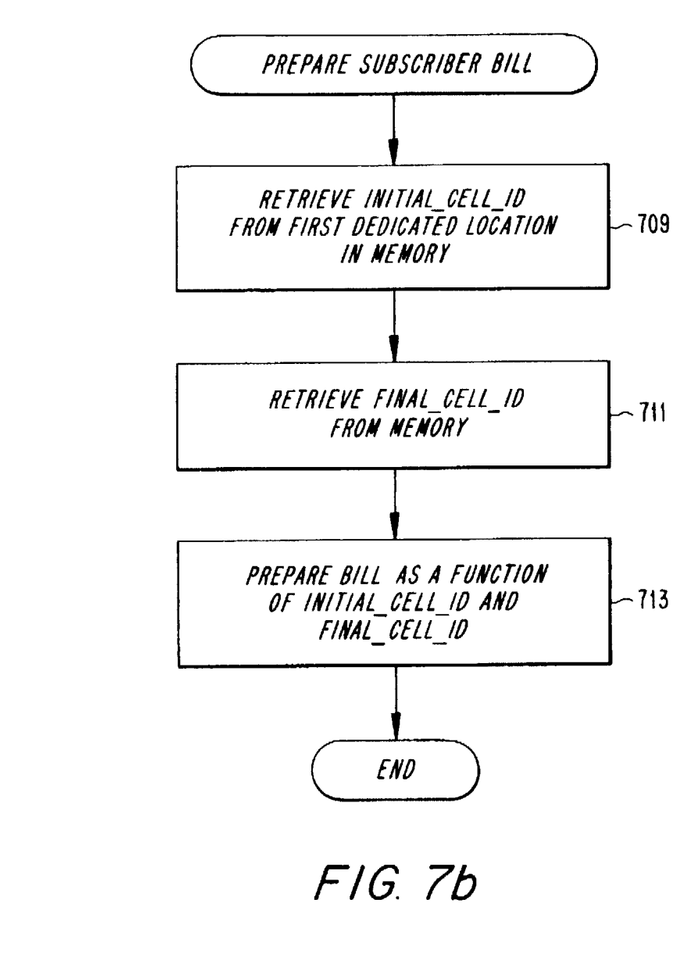

When it is time to prepare a bill for the subscriber's usage of the system, the charging processor 507 operates as illustrated in FIG. 7b. First, it retrieves both the initial_cell_id (step 709) and the final_cell_id (step 711) from the memory 505, and uses either or, alternatively, both to determine the tariff that is applicable to this particular call (step 713).

Figure 8A:
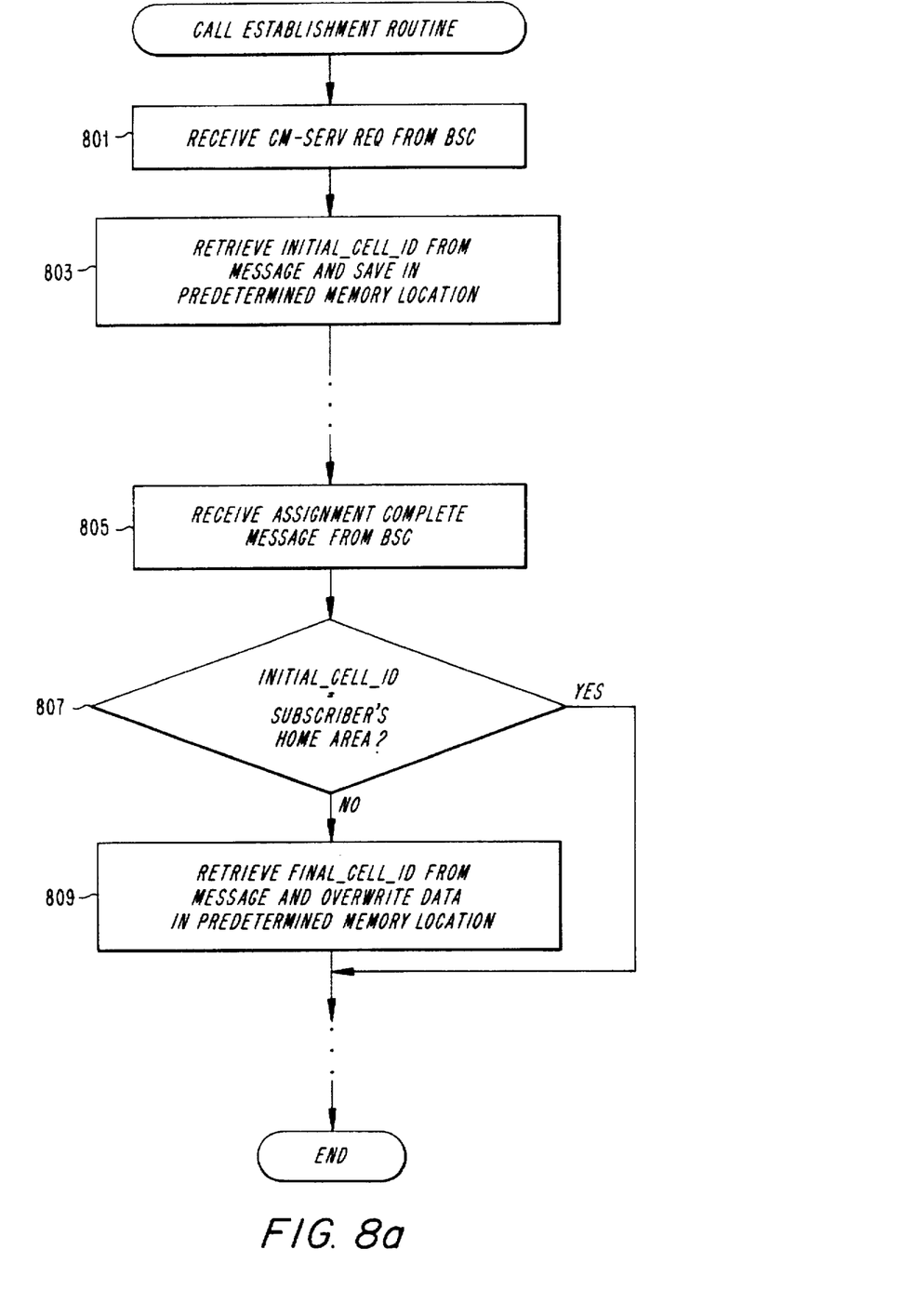
FIGS. 8a and 8b are flowcharts of methods for establishing a call and preparing a subscriber bill in accordance with yet another embodiment of the invention.

Another alternative embodiment of the call establishment processor 503 is depicted in the flowchart of FIG. 8a. As before, the CM-SERV REQUEST message is received from the BSC 105 (step 801). The initial_cell_id is then extracted from the received message, and is stored into a location of the memory 505 (step 803). Call establishment processing then continues as described, for example, in FIG. 2, until either the ASSIGNMENT COMPLETE message 211 is received from the BSC 105, or the HANDOVER-COMPLETE message 411 is received from the BSS-B 413 (step 809). Then, the previously received initial_cell_id is tested to see whether it indicates that the MS-originated call was initiated from the subscriber's home area (step 807). If so, then this information must be retained ("YES" path out of step 807). Otherwise, the call establishment processor 503 retrieves the final_cell_id from the ASSIGNMENT COMPLETE message or, alternatively in the case of directed retry, from the HANDOVER-REQUEST message 411, and stores it at the same location in the memory 505 that held the initial_cell_id, thereby overwriting the initial_cell_id (step 809). Call establishment processing then continues as previously described with respect to FIG. 2.

Figure 8B:
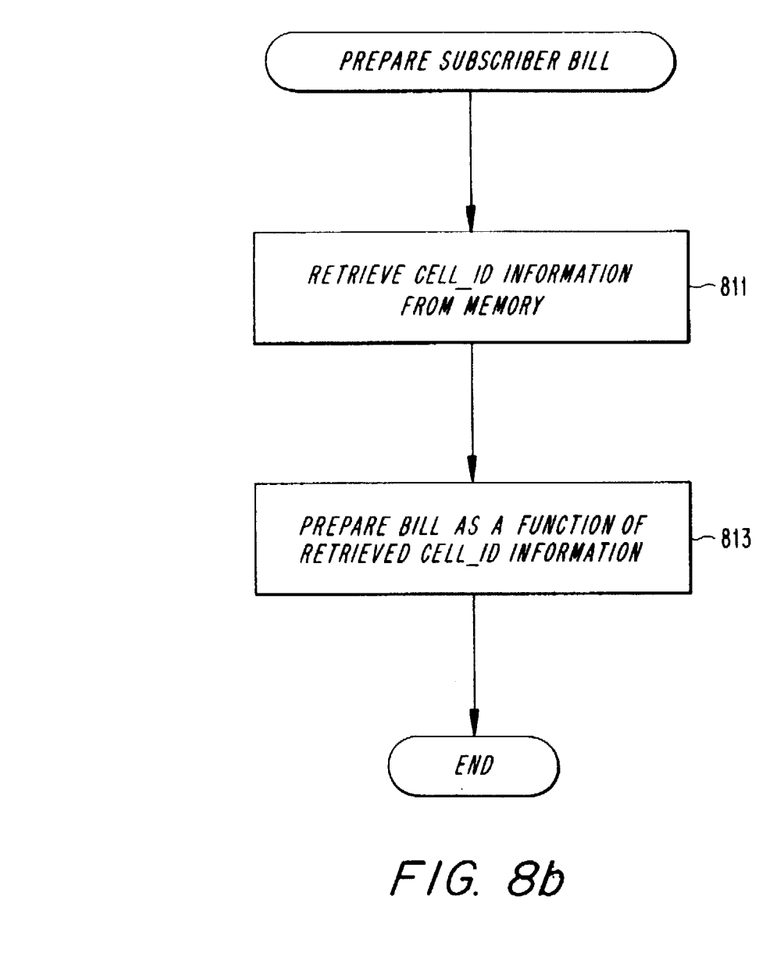

When it is time to prepare a bill for the subscriber's usage of the system, the charging processor 507 operates as illustrated in FIG. 8b. First, it retrieves cell_id information from the memory location (step 811). Then, the charging processor 507 uses the retrieved information to determine the tariff that is applicable to this particular call (step 813).

The invention has been described with reference to particular embodiments. However, it will be readily apparent to those skilled in the art that it is possible to embody the invention in specific forms other than those of the preferred embodiments described above. This may be done without departing from the spirit of the invention. For example, in each of the above-described embodiments, the charging processor has been portrayed as operating without operator intervention. However, alternative embodiments may readily be realized which provide a man-machine interface, in order to allow an operator to make real-time decisions concerning what information to use in order to make the service-providing decisions.

Thus, the preferred embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A method of providing a mobile subscriber service in a cellular communications system having a base station and a mobile switching center, the method comprising the steps of:

in the base station, receiving a channel request from the mobile subscriber, wherein the channel request indicates that the mobile subscriber is initiating a call;

in the base station, assigning a first cell for immediate use by the mobile subscriber, the first cell being designated by an initial cell identifier;

sending the initial cell identifier from the base station to the mobile switching center;

in the mobile switching center, storing the initial cell identifier in memory means for use when the mobile subscriber service is to be provided;

when the mobile subscriber service is to be provided, retrieving the initial cell identifier from the memory means; and basing a decision on the retrieved initial cell identifier, wherein the decision concerns an aspect of the mobile subscriber service, and further comprising the steps of:

in the base station, after assigning the first cell for immediate use by the mobile subscriber but before the call has been established, assigning a second cell for use by the mobile subscriber during the call, the second cell being designated by a final cell identifier, wherein the second cell is different from the first cell; and sending the final cell identifier from the base station to the mobile switching center.

2. The method of claim 1, further comprising the steps of:

in the mobile switching center, storing the final cell identifier in the memory means for use when the mobile subscriber service is to be provided;

when the mobile subscriber service is to be provided, retrieving the final cell identifier from the memory means; and basing the decision on the retrieved initial cell identifier and the retrieved final cell identifier.

3. The method of claim 1, wherein:

the mobile subscriber service is generation of a bill; and the decision is selection of a billing rate for the call.

4. The method of claim 3, wherein the billing rate is a free call if the initial cell identifier designates a home area of the mobile subscriber.

5. An apparatus for providing a mobile subscriber service in a cellular communications system having a base station and a mobile switching center, the apparatus comprising:

in the base station:

means for receiving a channel request from the mobile subscriber, wherein the channel request indicates that the mobile subscriber is initiating a call; and means, responsive to the received channel request, for assigning a first cell for immediate use by the mobile subscriber, the first cell being designated by an initial cell identifier;

means for sending the initial cell identifier from the base station to the mobile switching center;

in the mobile switching center:

memory means for storing the initial cell identifier for use when the mobile subscriber service is to be provided; and means for retrieving the initial cell identifier from the memory means when the mobile subscriber service is to be provided; and means for basing a decision on the retrieved initial cell identifier, wherein the decision concerns an aspect of the mobile subscriber service, and further comprising:

in the base station, means for assigning a second cell for use by the mobile subscriber during the call, the second cell being designated by a final cell identifier, wherein the second cell is different from the first cell, and wherein assignment of the second cell is made after the first cell has been assigned but before the call has been established; and means for sending the final cell identifier from the base station to the mobile switching center.

6. The apparatus of claim 5, further comprising:

in the mobile switching center, means for storing the final cell identifier in the memory means for use when the mobile subscriber service is to be provided;

means for retrieving the final cell identifier from the memory means when the mobile subscriber service is to be provided; and means for basing the decision on the retrieved initial cell identifier and the retrieved final cell identifier.

7. The apparatus of claim 5, wherein:

the mobile subscriber service is generation of a bill; and the decision is selection of a billing rate for the call.

8. The apparatus of claim 7, wherein the billing rate is a free call if the initial cell identifier designates a home area of the mobile subscriber.

* * * * *